US012088580B2

(12) United States Patent
Guo

(10) Patent No.: US 12,088,580 B2
(45) Date of Patent: Sep. 10, 2024

(54) DEVICE BINDING METHOD AND DEVICE

(71) Applicants: Gree Electric Appliances, Inc. of Zhuhai, Guangdong (CN); Zhuhai Leayun Technology Co., Ltd, Zhuhai (CN)

(72) Inventor: Yingshan Guo, Guangdong (CN)

(73) Assignees: Gree Electric Appliances, Inc. of Zhuhai, Zhuhai (CN); Zhuhai Leayun Technology Co., Ltd, Zhuhai (CN)

( * ) Notice: Subject to any disclaimer, the term of this patent is extended or adjusted under 35 U.S.C. 154(b) by 416 days.

(21) Appl. No.: 17/620,838

(22) PCT Filed: Jul. 6, 2020

(86) PCT No.: PCT/CN2020/100336
§ 371 (c)(1),
(2) Date: Dec. 20, 2021

(87) PCT Pub. No.: WO2021/042860
PCT Pub. Date: Mar. 11, 2021

(65) Prior Publication Data
US 2022/0360576 A1 Nov. 10, 2022

(30) Foreign Application Priority Data
Sep. 6, 2019 (CN) .......................... 201910839955.9

(51) Int. Cl.
*G06F 7/04* (2006.01)
*H04L 9/40* (2022.01)
(52) U.S. Cl.
CPC ........ *H04L 63/083* (2013.01); *H04L 63/0435* (2013.01); *H04L 63/0876* (2013.01)
(58) Field of Classification Search
CPC . H04L 63/0435; H04L 63/0876; H04L 63/10; H04L 63/083; H04W 12/50;
(Continued)

(56) References Cited

U.S. PATENT DOCUMENTS 10,178,474 B2 1/2019 Klimanis
11,284,258 B1 * 3/2022 Wei .......................... H04L 63/10
(Continued)

FOREIGN PATENT DOCUMENTS

CN 104121663 A 10/2014
CN 105024995 A 11/2015
(Continued)

OTHER PUBLICATIONS

Mao et al, Security Analysis of Smart Home Based on Life Cycle, Apr. 23, 2019, IEEE, pp. 1444-1449. (Year: 2019).*
(Continued)

*Primary Examiner* — Philip J Chea
*Assistant Examiner* — Jenise E Jackson
(74) *Attorney, Agent, or Firm* — McAndrews, Held & Malloy, Ltd.

(57) ABSTRACT

The present disclosure discloses a device binding method and device, used to resolve the issue of the prior art in which the operation of controlling a smart device in a certain position is cumbersome. The method of embodiments of the present disclosure comprises: a user terminal sending target address information to a server, the server encrypting the target address information, generating a verification password, and sending the verification password to the user terminal; the user terminal sending, by means of a transmission device, the verification password to a device to be bound; the device sending the received verification password and a device identifier of the device to the server; and if the verification password sent by the device is the same as the verification password generated by the server, the server binding the target address information corresponding to the received verification password to the device identifier.

5 Claims, 5 Drawing Sheets

(58) Field of Classification Search
CPC .... G06F 21/1011; G06F 21/335; G06F 21/35; G06F 21/44
See application file for complete search history.

(56) References Cited

U.S. PATENT DOCUMENTS

| | | | |
|---|---|---|---|
| 2015/0282223 A1 | 10/2015 | Wang et al. | |
| 2016/0241401 A1* | 8/2016 | Wang | H04L 9/14 |
| 2018/0337922 A1* | 11/2018 | Liao | G06F 21/44 |
| 2019/0392829 A1* | 12/2019 | Wei | G06F 3/167 |
| 2022/0163932 A1* | 5/2022 | Yan | G06F 3/04817 |
| 2022/0171399 A1* | 6/2022 | Wei | G01C 21/30 |

FOREIGN PATENT DOCUMENTS

| | | |
|---|---|---|
| CN | 106681282 A | 5/2017 |
| CN | 107071862 A | 8/2017 |
| CN | 107749813 A | 3/2018 |
| CN | 108399726 A | 8/2018 |
| CN | 108600057 A | 9/2018 |
| CN | 108736925 A | 11/2018 |
| CN | 108983624 A | 12/2018 |
| CN | 108986821 A | 12/2018 |
| CN | 109407541 A | 3/2019 |
| CN | 109788605 A | 5/2019 |
| CN | 110351169 A | 10/2019 |
| EP | 3041280 A1 | 7/2016 |

OTHER PUBLICATIONS

Gao et al, SecT: A Lightweight Secure Thing-Centered IoT Communication System, Oct. 12, 2018, IEEE, pp. 46-54. (Year: 2018).*
International Search Report, with a mailing date of Oct. 10, 2020, in International application No. PCT/CN2020/100336, filed on Jul. 6, 2020 (5 pages).
Chinese first search report dated Sep. 6, 2019 in Chinese application No. 2019108399559 (1 page).
Chinese second search report dated Sep. 6, 2019 in Chinese application No. 2019108399559 (1 page).

* cited by examiner

DEVICE BINDING METHOD AND DEVICE

CROSS-REFERENCE TO RELATED APPLICATION

The present disclosure is 371 of International Patent Application No. PCT/CN2020/100336, filed July 6, 2020, which claims priority to Chinese Patent Application No. 201910839955.9, filed on Sep. 6, 2019 and entitled "Device Binding Method and Device", the disclosure of which is hereby incorporated by reference in its entirety.

TECHNICAL FIELD

The present disclosure relates to the technical field of terminals, and in particular, to a device binding method and device.

BACKGROUND

With continuous development of science and technology, more and more smart devices can be controlled by an application (APP) on a terminal, such as a smart air-conditioner, a smart rice cooker, a smart TV, a smart refrigerator, and so on.

Generally, a plurality of smart devices may be bound on one APP of the terminal, in order to distinguish positions of the plurality of smart devices, a room map may be simulated on the APP, and then the smart devices are added to rooms that need to be placed on the simulated room map. When a smart device needs to be controlled, the room where the smart device is located is found firstly, then the smart device in the room is selected, and finally the selected smart device is controlled.

For example, three smart air conditioners are bound to an APP, and the three smart air conditioners are located in different rooms, namely room 1, room 2, and room 3. If a user wants to control the smart air conditioner in room 1, the user needs to find room 1, then selects the smart air conditioner in room 1, and finally uses the APP to control the smart air conditioner in the selected room 1.

When controlling a smart device at a certain position in the related art, it is necessary to construct a virtual map first, and then add the smart device to a certain position on the virtual map, and then control the smart device at a certain position. Firstly, the position is found on the virtual map, then the smart device in the position is selected, and finally the smart device is controlled, and the operation is relatively cumbersome.

SUMMARY

In a first aspect, an embodiment of the present disclosure provides a device binding method, which includes the following operations.

A server encrypts received target address information, generates a verification password.

The server sends the verification password to a user terminal, so that the user terminal sends, by means of a transmission device, the verification password to a device to be bound.

When receiving the verification password sent by the device to be bound, the server determines whether the verification password sent by the device to be bound is the same as a verification password generated by the server, and if so, the server binds the target address information corresponding to the verification password sent by the device to be bound to a device identifier of the device to be bound.

In a possible embodiment, the server encrypting the received target address information, generating the verification password further includes the following operations.

The server sends a preset valid time to the user terminal, so that the user terminal sends, by means of the transmission device, the verification password to the device to be bound within the valid time, the valid time is the time used to indicate that the verification password is valid.

In a possible embodiment, after the binding of the target address information corresponding to the verification password sent by the device to be bound to the device identifier of the device to be bound has been performed, the method further includes the following operations.

The server receives the target address information sent by the user terminal.

The server determines the device identifier according to the target address information sent by the user terminal and a binding relationship between the target address information and the device identifier.

The server sends a control instruction sent by the user terminal to the device corresponding to the device identifier, so that the device executes the control instruction.

In a second aspect, an embodiment of the present disclosure provides a second device binding method, which includes the following operations.

A user terminal sends target address information selected a user to a server.

The user terminal receives a verification password returned by the server, so that the user terminal sends, by means of a transmission device, the verification password to a device to be bound, the verification password is generated by the server by encrypting the target address information, and used to determine whether binding of the target address information to the device identifier of the device to be bound has been performed.

In a possible embodiment, after the user terminal sends the target address information selected by the user to the server, the method further includes the following operations.

The user terminal receives a valid time sent by the server, so that the user terminal sends, by means of the transmission device, the verification password to the device to be bound within the valid time, the valid time is the time used to indicate that the verification password is valid.

In the above method, the user terminal receives the valid time sent by the server, so that the user terminal sends, by means of the transmission device, the verification password to the device to be bound within the valid time, here the valid time is the time used to indicate that the verification password is valid. Since the user terminal sends, by means of the transmission device, the verification password to the device to be bound within the valid time, therefore the security of the verification password can be ensured.

In a possible embodiment, after the user terminal receives the verification password returned by the server, the method further includes the following operations.

The user terminal sends the target address information to the server, so that the server determines the device identifier according to the target address information and the binding relationship between the target address information and the device identifier.

The user terminal sends a control instruction to the server, so that the server sends the control instruction to the device corresponding to the determined device identifier.

In a third aspect, an embodiment of the present disclosure provides a third device binding method, which includes the following operations.

A device to be bound receives a verification password sent by a user terminal by means of a transmission device.

The device to be bound sends the verification password and a device identifier of the device to be bound to a server, so that the server determines according to the verification password whether binding of the received target address information to the device identifier of the device to be bound has been performed.

In a possible embodiment, the device to be bound sending the verification password and the device identifier of the device to be bound to the server includes the following operation.

The device to be bound sends, by means of a Narrow-Band-Internet Of Things (NB-IoT) component, the verification password and the device identifier of the device to be bound to the server.

In a fourth aspect, an embodiment of the present disclosure provides a device binding device. The device includes: a processing unit and a storage unit, the storage unit stores program codes, and when one or more computer programs stored in the storage unit are executed by the processing unit, the device executes the following processes.

The received target address information is encrypted, a verification password is generated.

The verification password is sent to a user terminal, so that the user terminal sends, by means of a transmission device, the verification password to a device to be bound.

When the verification password sent by the device to be bound is received, it is determined whether the verification password sent by the device to be bound is the same as the verification password generated by the server, and if so, the target address information corresponding to the verification password sent by the device to be bound is bound to a device identifier of the device to be bound.

In a possible embodiment, the processing unit is further configured to:

send a preset valid time to the user terminal, so that the user terminal sends, by means of the transmission device, the verification password to the device to be bound within the valid time, the valid time is the time used to indicate that the verification password is valid.

In a possible embodiment, the processing unit is further configured to:

receive the target address information sent by the user terminal;

determine the device identifier according to the target address information and a binding relationship between the target address information and the device identifier; and send a control instruction sent by the user terminal to the device corresponding to the device identifier, so that the device executes the control instruction.

In a fifth aspect, an embodiment of the present disclosure provides a second device binding device. The device includes: a processing unit and a storage unit, the storage unit stores program codes, and when one or more computer programs stored in the storage unit are executed by the processing unit, the device executes the following processes.

Target address information selected by a user is sent to a server.

A verification password returned by the server is received, so that the user terminal sends, by means of a transmission device, the verification password to a device to be bound, the verification password is generated by the server by encrypting the target address information, and used to determine whether binding of the target address information to the device identifier of the device to be bound has been performed.

In a possible embodiment, the processing unit is further configured to:

receive a valid time sent by the server, so that the user terminal sends, by means of the transmission device, the verification password to the device to be bound within the valid time, the valid time is the time used to indicate that the verification password is valid.

In a possible embodiment, the processing unit is further configured to:

send the target address information to the server, so that the server determines the device identifier according to the target address information and the binding relationship between the target address information and the device identifier; and send a control instruction to the server, so that the server sends the control instruction to a device corresponding to the determined device identifier.

In a sixth aspect, an embodiment of the present disclosure provides a third device binding device. The device includes: a processing unit and a storage unit, the storage unit stores program codes, and when one or more computer programs stored in the storage unit are executed by the processing unit, the device executes the following processes.

A verification password sent by a user terminal by means of a transmission device is received.

The verification password and a device identifier of a device to be bound are sent to a server, so that the server determines according to the verification password whether binding of the received target address information to the device identifier of the device to be bound has been performed.

In a possible embodiment, the processing unit is specifically configured to:

send the verification password and the device identifier of the device to be bound, by means of a NB-IoT component, to the server.

In a seventh aspect, an embodiment of the present disclosure provides a fourth device binding device, which includes a generating component, a first sending component, and a binding component.

The generating component is configured to encrypt received target address information, generate a verification password.

The first sending component is configured to send the verification password to a user terminal, so that the user terminal sends, by means of a transmission device, the verification password to a device to be bound.

The binding component is configured to determine whether the verification password sent by the device to be bound is the same as the verification password generated by the server when the verification password sent by the device to be bound is received, if so, the target address information corresponding to the verification password sent by the device to be bound is bound to a device identifier of the device to be bound.

In a eighth aspect, an embodiment of the present disclosure provides a fifth device binding device, which includes a second sending component and a first receiving component.

The second sending component is configured to send target address information selected by a user to a server.

The first receiving component is configured to receive a verification password returned by the server, so that the user terminal sends, by means of a transmission device, the verification password to a device to be bound, the verification password is generated by the server by encrypting the target address information, and used to determine whether binding of the target address information to the device identifier of the device to be bound has been performed.

In a ninth aspect, an embodiment of the present disclosure provides a sixth device binding device, which includes a second receiving component and a third sending component.

The second receiving component is configured to receive a verification password sent by a user terminal by means of a transmission device.

The third sending component is configured to send the verification password and a device identifier of the device to be bound to the server, so that the server determines according to the verification password whether binding of the received target address information to the device identifier of the device to be bound has been performed.

In a tenth aspect, an embodiment of the present disclosure further provides a computer storage medium having stored thereon computer programs that, when executed by a processor, implement operations of any one of the methods described in the first aspect, the second aspect, and the third aspect.

In addition, the technical effects brought by any one of the embodiments of the fourth aspect to the tenth aspect may be referred to the technical effects brought by different embodiments in the first, second, and third aspects and details are not described herein again.

These and other aspects of the present disclosure will be more concise and understandable in the description of the following embodiments.

BRIEF DESCRIPTION OF THE DRAWINGS

In order to describe the technical solutions in the embodiments of the disclosure more clearly, the drawings required to be used in descriptions about the embodiments will be simply introduced below. It is apparent that the drawings in the following descriptions are only some embodiments of the disclosure. Those of ordinary skill in the art may further obtain other drawings according to these drawings without creative work.

DETAILED DESCRIPTION OF THE EMBODIMENTS

In order to make the objectives, technical solutions, and advantages of the present disclosure clearer, the present disclosure will be further described in detail below in conjunction with the accompanying drawings. It is apparent that the described embodiments are only a part of, but not all of the embodiments of the present disclosure. Based on the embodiment in the disclosure, all other embodiments obtained by those of ordinary skill in the art without creative work shall fall within the protection scope of this present disclosure.

The current smart device can be bound to an APP of a terminal, such as a smart air conditioner, a smart refrigerator, a smart television, etc. After binding of the smart device to the APP of the terminal has been performed, the APP of the terminal may control the smart device. However, if a plurality of smart devices are bound to one APP of the terminal, for example, a plurality of smart air conditioners of the same model are bound to one APP of a terminal, if the smart air conditioner is bound to a room number, when a user wants to control the smart air conditioner of a bedroom 1, the user may control the smart air conditioner of the room by selecting the room number.

In order to control the smart air conditioner by selecting the room number, the room number and the smart air conditioner need to be bound, the room number and the smart air conditioner need to be bound. The server of the present disclosure may encrypt position information of the smart device to generate a verification password, and then a user terminal may send the verification password to the smart device, the smart device sends the verification password and a device identifier of the smart device to the server. After receiving the verification password, the server compares the received verification password with the password generated by the server, if they are the same, target address information corresponding to the verification password is bound to the received device identifier, so that the smart device is bound to the position of the smart device. After the smart device and the position of the smart device are bound, the user terminal directly selects the position information bound to the smart device when the smart device needs to be controlled.

The application scenario described in the embodiments of the present disclosure is for more clearly illustrating the technical solutions of the embodiments of the present disclosure, and does not constitute a limitation to the technical solutions provided in the embodiments of the present disclosure. Those of ordinary skill in the art will know that with the development of new application scenarios, the technical solutions provided by the embodiments of the present disclosure are equally applicable to similar technical problems.

Figure 1:
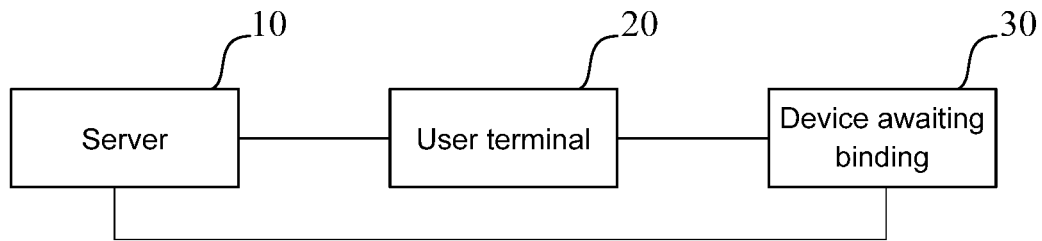
FIG. 1 is a schematic structural diagram of a device binding system provided by an embodiment of the present disclosure.

For the above-mentioned application scenario, an embodiment of the present disclosure provides a device binding system, as shown in FIG. 1, the system includes: a server 10, a user terminal 20, and a device to be bound 30.

The server 10 is configured to encrypt received target address information, generates a verification password; and then sends the verification password to the user terminal, so that the user terminal sends, by means of a transmission device, the verification password to a device to be bound;

when receiving the verification password sent by the device to be bound, the server determines whether the verification password sent by the device to be bound is the same as the verification password generated by the server, and if so, the server binds the target address information corresponding to the verification password sent by the device to be bound to a device identifier of the device to be bound.

The user terminal 20 is configured to send the target address information selected by a user to the server; and receive a verification password returned by the server, so that the user terminal sends, by means of the transmission device, the verification password to the device to be bound, the verification password is generated by the server by encrypting the target address information, and used to determine whether the target address information is bound to the device identifier of the device to be bound.

The device to be bound 30 is configured to receive the verification password sent by a user terminal by means of the transmission device; send the verification password and the device identifier of the device to the server, so that the server determines according to the verification password whether binding of the target address information to the device identifier of the device to be bound has been performed.

In the embodiments of the present disclosure, the user terminal sends the target address information selected by the user to the server, the server encrypts the received target address information, generates the verification password, and sends the verification password to the user terminal, the user terminal sends, by means of the transmission device, the verification password to the device to be bound, after the device to be bound receives the verification password, the verification password and the device identifier of the device to be bound are sent to the server; and when the server receives the verification password sent by the device to be bound, it is determined whether the verification password sent by the device to be bound is the same as the verification password generated by the server, and if so, the target address information corresponding to the verification password sent by the device to be bound is bound to the device identifier of the device to be bound. Since the verification password is used to determine whether binding of the target address information to the device identifier of the device to be bound has been performed, after the binding of the target address information to the device to be bound has been performed, the user terminal directly controls the device by means of the selected target address information, thereby facilitating operation.

After the binding of the target address information to the device to be bound has been performed, an effective management of the device may further be achieved.

Here, the target address information may be the room number, such as room number X in Building X of XX apartment.

The user terminal may be a mobile phone, a tablet computer, and a terminal that may communicate with the server and can display or broadcast the password is applicable to the embodiments of the present disclosure.

The transmission device may be a remote controller having an infrared function, or may be a transmission device disposed inside the user terminal and having infrared and transmission functions.

That is to say, the user terminal and the transmission device may be the same device, that is, the transmission device is located in the user terminal, such as a mobile phone having an infrared function, or a tablet computer having an infrared function. The user terminal and the transmission device may also be two independent devices, such as a mobile phone and a remote controller having an infrared function.

Before sending the target address information to the server, the user terminal stores therein a plurality of target address information, for example, room 1, room 2, and room 3, and the user selects one target address information from the plurality of target address information stored in the user terminal.

The user terminal sends the target address information selected by the user to the server, and the server encrypts the target address information to generate the verification password. Here, the process of encrypting the target address information, generating the verification password is the same as that of the related art, and will not be repeated here.

For example, the server encrypts the room number 1, and the generated verification password is 123.

The server returns the generated verification password to the user terminal, for example, the generated verification password 123 is returned back to the user terminal.

After receiving the verification password returned by the server, the user terminal may display the verification password on the user terminal, and may also broadcast the verification password in the form of voice.

The user may send, by means of the transmission device, the verification password to the device to be bound, for example, send, by means of an infrared remote controller, the verification password to a smart air conditioner.

When the server sends the verification password to the user terminal, it can further send a preset valid time, such as 10 minutes, to the user terminal at the same time. After the user terminal receives the valid time, the valid time may be displayed on the user terminal, or may also be broadcast in the form of voice.

The valid time is used to indicate that the verification password is valid within the valid time, that is, after the valid time passed, the verification password becomes invalid and cannot be used.

The user sends, by means of the transmission device, the valid password to the device to be bound within the valid time, after the device to be bound receives the verification password, the verification password and the device identifier of the device to be bound are sent to the server.

When receiving the verification password sent by the device to be bound and the device identifier of the device to be bound, the server determines whether the verification password sent by the device to be bound is the same as the verification password generated by the server, and if so, the server binds the target address information corresponding to the verification password sent by the device to be bound to the device identifier of the device to be bound.

It is to be noted that the server may receive the target address information sent by a plurality of user terminal, that is to say, the server may store a plurality of verification passwords generated by encrypting the target address information, so when it is determined whether the verification password sent by the device to be bound is the same as the verification password generated by the server, the verification password sent by the device to be bound may be compared with the plurality of verification passwords stored in the server, and if the plurality of verification passwords stored in the server have a verification password that is the same as the verification password sent by the device to be bound, the server binds the target address information corresponding to the verification password sent by the device to be bound to the device identifier of the device to be bound.

Specifically, when the server encrypts the target address information, generates the verification password, it may store a corresponding relationship between the target address information and the verification password, for example, the verification password generated by encrypting the room number 1 is 123, and the verification password generated by encrypting the room number 2 is 456, and the verification password generated by encrypting the room number 3 is 789, and the corresponding relationships between the room numbers and the verification passwords maybe stored in the server, as shown in Table 1.

TABLE 1

| Serial number | Target address information | Verification password |
|---|---|---|
| 1 | Room number 1 | 123 |
| 2 | Room number 2 | 456 |
| 3 | Room number 3 | 789 |

If the server only generates one verification password, when the server receives the verification password sent by the device to be bound, it is determined whether the verification password sent by the device to be bound is the same as the verification password generated by the server; if the server generates a plurality of verification passwords, when the server receives the verification password sent by the device to be bound, it is determined whether the verification password sent by the device to be bound is the same as the plurality of verification passwords generated by the server, for example, the verification password sent by the device to be bound and received by the server is 456, the verification passwords generated by the server are "123", "456", and "789", the server determines that the received verification password sent by the device to be bound is the same as the verification password "456" generated by the server, then the server binds the target address information corresponding to "456" with the device identifier of the device to be bound.

After checking the table, it is determined that the target address information corresponding to the verification password 456 is room number 2, the server binds the room number 2 to the received device identifier of the device to be bound, so that the device to be bound may be controlled after the room number 2 is selected.

Besides storing the binding relationship between the target address information and the verification password, the server may further use an agreed secret key to decrypt the verification password sent by the device to be bound after determining that the generated verification password is the same as the verification password sent by the device to be bound, to obtain the target address information corresponding to the verification password sent by the device to be bound, and therefore binds the target address information to the device identifier of the device to be bound.

After the server binds the target address information corresponding to the verification password sent by the device to be bound to the device identifier of the device to be bound, the server receives the target address information sent by the user terminal, and then determines the device identifier according to the target address information sent by the user terminal and the binding relationship between the target address information and the device identifier, and finally sends a control instruction sent by the user terminal to the device corresponding to the device identifier, so that the device executes the control instruction. The user terminal may control the device by selecting the target address information, and therefore the operation is simple.

It is to be noted that the user terminal here may be a terminal that sends the target address information to the server when the binding of the target address information to the device identifier is achieved, or may also be other terminals that can control the device, both of which are applicable to the embodiments of the present disclosure.

Based on the same inventive concept, an embodiment of the present disclosure further provides a device binding method. Since the device corresponding to the method is a server in the device binding system in the embodiments of the present disclosure, and the principle the method solves the problem is similar to that of the device, so the embodiment of this method may refer to the embodiment of the system, and will not be repeated.

Figure 2:
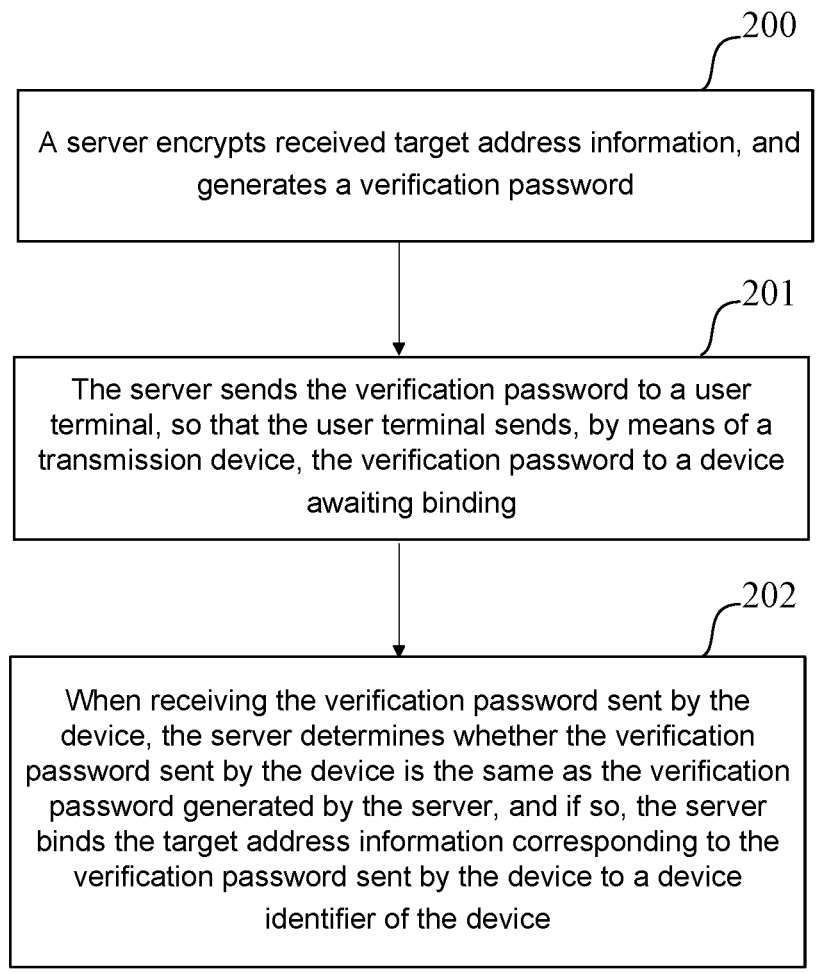
FIG. 2 is a schematic flowchart of a first device binding method provided by an embodiment of the present disclosure.

As shown in FIG. 2, an embodiment of the present disclosure provides a device binding method, which includes the following steps.

At S200, a server encrypts received target address information, generates a verification password.

At S201, the server sends the verification password to a user terminal, so that the user terminal sends, by means of a transmission device, the verification password to a device to be bound.

At S202, when receiving the verification password sent by the device to be bound, the server determines whether the verification password sent by the device to be bound is the same as the verification password generated by the server, and if so, the server binds the target address information corresponding to the verification password sent by the device to be bound to a device identifier of the device to be bound.

In some embodiments, after the server encrypts the received target address information, generates the verification password, the method further includes the following operations.

The server sends a preset valid time to the user terminal, so that the user terminal sends, by means of the transmission device, the verification password to the device to be bound within the valid time, the valid time is the time used to indicate that the verification password is valid.

In some embodiments, after the server binds the target address information corresponding to the verification password sent by the device to be bound to the device identifier of the device to be bound, the method further includes following operations.

The server receives the target address information sent by the user terminal.

The server determines the device identifier according to the target address information sent by the user terminal and a binding relationship between the target address information and the device identifier.

The server sends a control instruction sent by the user terminal to the device corresponding to the device identifier, so that the device executes the control instruction.

Based on the same inventive concept, an embodiment of the present disclosure further provides a second device binding method. Since the device corresponding to the method is a user terminal in the device binding system in the embodiments of the present disclosure, and the principle the method solves the problem is similar to that of the device, so the embodiment of this method may refer to the embodiment of the system, and will not be repeated.

Figure 3:
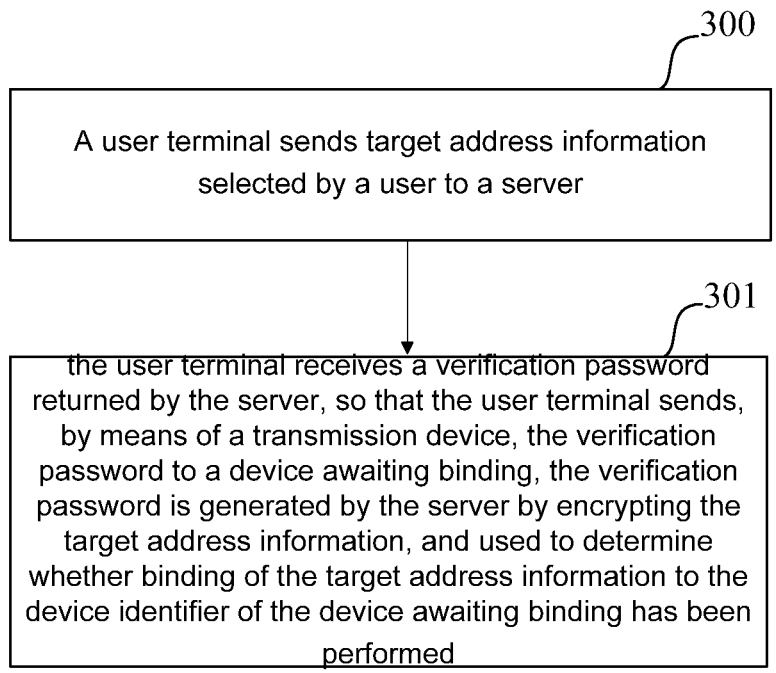
FIG. 3 is a schematic flowchart of a second device binding method provided by an embodiment of the present disclosure.

As shown in FIG. 3, an embodiment of the present disclosure provides a second device binding method, which includes the following steps.

At S300, a user terminal sends target address information selected by a user to a server.

At S301, the user terminal receives a verification password returned by the server, so that the user terminal sends, by means of a transmission device, the verification password to a device to be bound, the verification password is generated by the server by encrypting the target address information, and used to determine whether binding of the target address information to the device identifier of the device to be bound has been performed.

In some embodiments, after the user terminal sends the target address information selected by the user to the server, the method further includes the following operations.

The user terminal receives a valid time sent by the server, so that the user terminal sends, by means of the transmission device, the verification password to the device to be bound within the valid time, the valid time is the time used to indicate that the verification password is valid.

In some embodiments, after the user terminal receives the verification password returned by the server, the method further includes the following operations.

The user terminal sends the target address information to the server, so that the server determines the device identifier according to the target address information and the binding relationship between the target address information and the device identifier.

The user terminal sends a control instruction to the server, so that the server sends the control instruction to the device corresponding to the determined device identifier.

Based on the same inventive concept, an embodiment of the present disclosure further provides a third device binding method. Since the device corresponding to the method is a device to be bound in the device binding system in the embodiments of the present disclosure, and the principle the method solves the problem is similar to that of the device, so the embodiment of this method may refer to the embodiment of the system, and will not be repeated.

Figure 4:
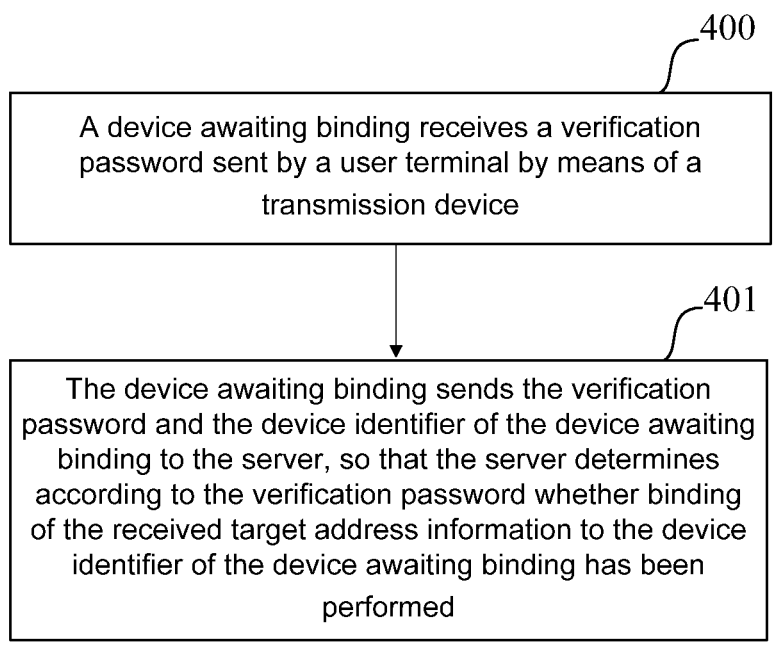
FIG. 4 is a schematic flowchart of a third device binding method provided by an embodiment of the present disclosure.

As shown in FIG. 4, an embodiment of the present disclosure provides a third device binding method, which includes the following steps.

At S400, a device to be bound receives a verification password sent by a user terminal by means of a transmission device.

At S401, the device to be bound sends the verification password and the device identifier of the device to be bound to the server, so that the server determines according to the verification password whether binding of the received target address information to the device identifier of the device to be bound has been performed.

In some embodiments, the device to be bound sending the target address information and the device identifier of the device to be bound to the server includes the following operation.

The device to be bound sends, by means of a Narrow-Band-Internet Of Things (NB-IoT) component, the verification password and the device identifier of the device to be bound to the server.

Figure 5:
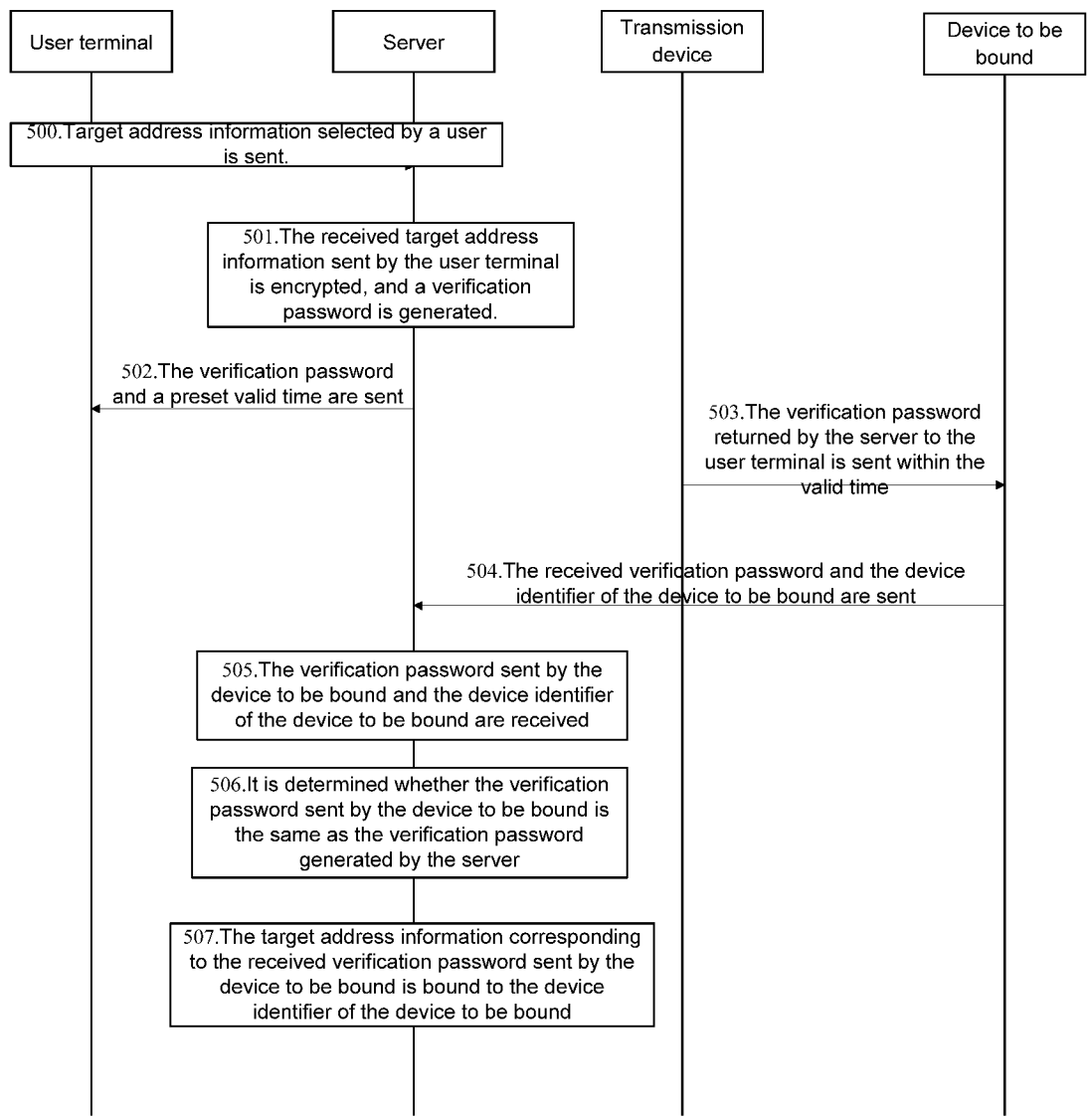
FIG. 5 is a schematic flowchart of a complete device binding method provided by an embodiment of the present disclosure.

As shown in FIG. 5, a schematic flowchart of a complete device binding method is provided by an embodiment of the present disclosure, the complete method includes the following steps.

At S500, a user terminal sends target address information selected by a user to a server.

At S501, a server encrypts the received target address information sent by the user terminal, generates a verification password.

At S502, the server sends the generated verification password and a preset valid time to the user terminal.

At S503, the transmission device sends the verification password returned to the user terminal to a device to be bound within the valid time.

At S504, the device to be bound sends the received verification password sent by the transmission device and the device identifier of the device to be bound to the server.

At S505, the server receives the verification password sent by the device to be bound and the device identifier of the device to be bound.

At S506, the server determines that the verification password sent by the device to be bound is the same as the verification password generated by the server.

At S507, the server binds the target address information corresponding to the verification password sent by the device to be bound to the device identifier of the device to be bound.

After the server binds the target address information to the device identifier of the device to be bound, the binding relationship is stored in the server. When the user needs to control the device corresponding to the target address information, the user may select the target address information from the APP of a certain terminal, and then send the target address information to the server, the server determines the device corresponding to the target address information, and the user sends, by means of an APP of a certain terminal, a control instruction to the device bound to the target address information, thereby controlling the device.

It is to be noted that the user terminal and the transmission device in the embodiment of the present disclosure are used for binding the target address information and the device to be bound. After binding of the target address information to the device to be bound has been performed, when the device to be bound is controlled, the user terminal may be used, or any terminal other than the user terminal that may communicate with the server may also be used.

Based on the same inventive concept, an embodiment of the present disclosure further provides a device binding device. Since the device is a server in the device binding system in the embodiments of the present disclosure, and the principle the device solves the problem is similar to the method, so the embodiment of this device may refer to the embodiment of the system, and will not be repeated.

Figure 6:
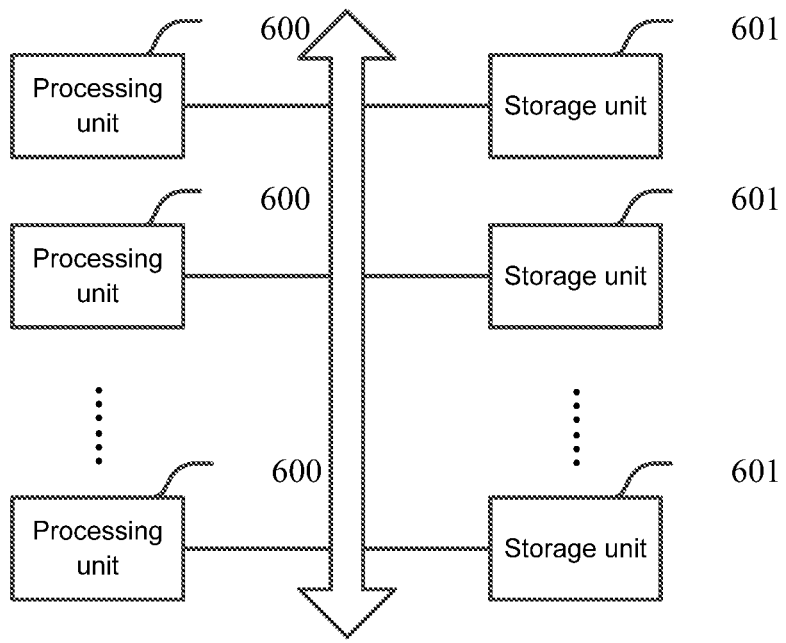
FIG. 6 is a schematic structural diagram of a first server of an embodiment of the present disclosure.

As shown in FIG. 6, an embodiment of the present disclosure provides a device binding device. The device includes: a processing unit 600 and a storage unit 601, the storage unit 601 stores program codes, and when one or more computer programs stored in the storage unit 601 are executed by the processing unit 600, the processing unit 600 is caused to execute the following processes.

Received target address information is encrypted to generate a verification password.

The verification password is sent to a user terminal, so that the user terminal sends, by means of a transmission device, the verification password to a device to be bound.

When the verification password sent by the device to be bound is received, it is determined whether the verification password sent by the device to be bound is the same as the verification password generated by the server, and if so, the target address information corresponding to the verification password sent by the device to be bound is bound to a device identifier of the device to be bound.

In some embodiments, the processing unit 600 is further configured to:

send a preset valid time to the user terminal, so that the user terminal sends, by means of the transmission device, the verification password to the device to be bound within the valid time, the valid time is the time used to indicate that the verification password is valid.

In some embodiments, the processing unit 600 is further configured to:

receive the target address information sent by the user terminal;

determine the device identifier according to the target address information and a binding relationship between the target address information and the device identifier; and send a control instruction sent by the user terminal to the device corresponding to the device identifier, so that the device executes the control instruction.

Based on the same inventive concept, an embodiment of the present disclosure further provides another device binding device. Since the device is a user terminal in the device binding system in the embodiments of the present disclosure, and the principle the device solves the problem is similar to the method, so the embodiment of this device may refer to the embodiment of the system, and will not be repeated.

Figure 7:
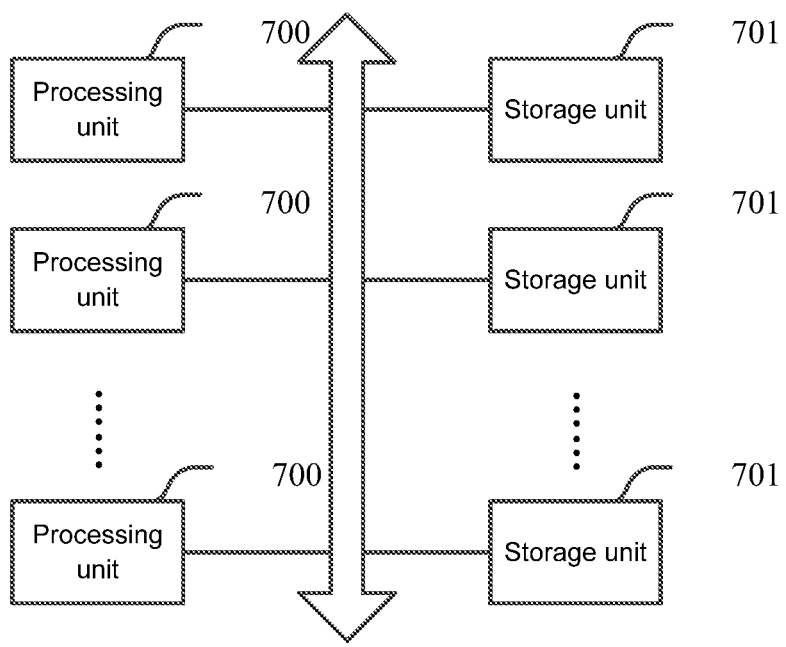
FIG. 7 is a schematic structural diagram of a first user terminal of an embodiment of the disclosure.

As shown in FIG. 7, an embodiment of the present disclosure provides a device binding device. The device includes: a processing unit 700 and a storage unit 701, the storage unit 701 stores program codes, and when one or more computer programs stored in the storage unit 701 are executed by the processing unit 700, the processing unit 700 is caused to execute the following processes.

Target address information selected by a user is sent to a server.

A verification password returned by the server is received, so that the user terminal sends, by means of a transmission device, the verification password to a device to be bound, the verification password is generated by the server by encrypting the target address information, and used to determine whether binding of the target address information to the device identifier of the device to be bound has been performed.

In some embodiments, the processing unit 700 is further configured to:

receive a valid time sent by the server, so that the user terminal sends, by means of the transmission device, the verification password to the device to be bound within the valid time, the valid time is the time used to indicate that the verification password is valid.

In some embodiments, the processing unit 700 is further configured to:

send the target address information to the server, so that the server determines the device identifier according to the target address information and the binding relationship between the target address information and the device identifier; and send a control instruction to the server, so that the server sends the control instruction to the device corresponding to the determined device identifier.

Based on the same inventive concept, an embodiment of the present disclosure further provides a device binding device. Since the device is a device to be bound in the device binding system in the embodiments of the present disclosure, and the principle the device solves the problem is similar to the method, so the embodiment of this device refer to the embodiment of the system, and will not be repeated.

Figure 8:
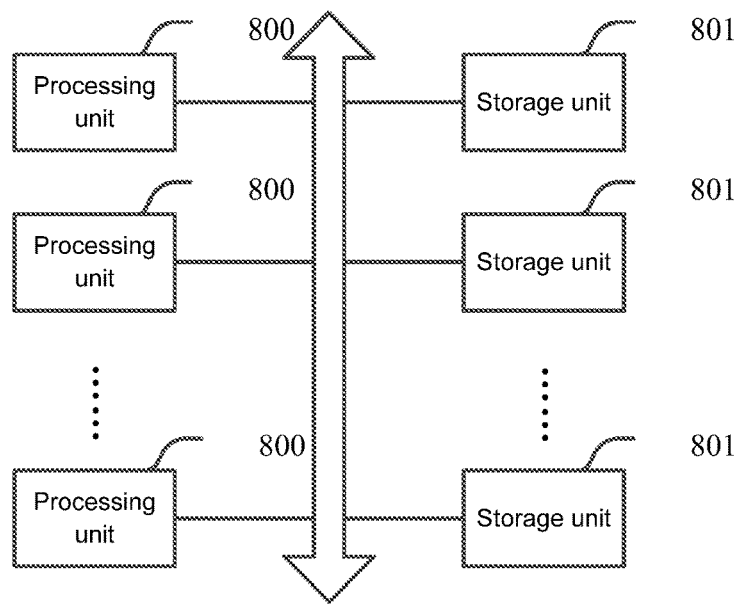
FIG. 8 is a schematic structural diagram of a first device to be bound of an embodiment of the present disclosure.

As shown in FIG. 8, an embodiment of the present disclosure provides a device binding device. The device includes: a processing unit 800 and a storage unit 801, the storage unit 801 stores program codes, and when one or more computer programs stored in the storage unit 801 are executed by the processing unit 800, the device executes the following processes.

A verification password sent by a user terminal by means of a transmission device is received.

The verification password and the device identifier of the device to be bound are sent to a server, so that the server determines according to the verification password whether binding of the received target address information to the device identifier of the device to be bound has been performed.

In some embodiments, the processing unit 800 is further configured to:

send the verification password and the device identifier of the device to be bound, by means of a NB-IoT component, to the server.

Based on the same inventive concept, an embodiment of the present disclosure further provides a device binding device. Since the device is a server in the device binding system in the embodiments of the present disclosure, and the principle the device solves the problem is similar to the method, so the embodiment of this device may refer to the embodiment of the system, and will not be repeated.

Figure 9:
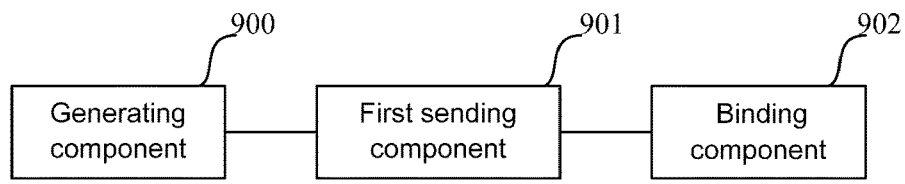
FIG. 9 is a schematic structural diagram of a second server of an embodiment of the present disclosure.

As shown in FIG. 9, an embodiment of the present disclosure provides a device binding device, which includes a generating component 900, a first sending component 901 and a binding component 902.

The generating component 900 is configured to encrypt received target address information, generate a verification password; the first sending component 901 is configured to send the verification password to a user terminal, so that the user terminal sends, by means of a transmission device, the verification password to a device to be bound.

The binding component 902 is configured to determine whether the verification password sent by the device to be bound is the same as the verification password generated by the server when receiving the verification password sent by the device to be bound, and if so, the server binds the target address information corresponding to the verification password sent by the device to be bound to a device identifier of the device to be bound.

In some embodiments, the first sending component 901 is further configured to:

send a preset valid time to the user terminal, so that the user terminal sends, by means of the transmission device, the verification password to the device to be bound within the valid time, the valid time is the time that the related art indicates that the verification password is valid.

In some embodiments, the binding component 902 is further configured to:

receive the target address information sent by the user terminal;

determine the device identifier according to the target address information and a binding relationship between the target address information and the device identifier; and send a control instruction sent by the user terminal to the device corresponding to the device identifier, so that the device executes the control instruction.

Based on the same inventive concept, an embodiment of the present disclosure further provides a device binding device. Since the device is a user terminal in the device binding system in the embodiments of the present disclosure, and the principle the device solves the problem is similar to the method, so the embodiment of this device may refer to the embodiment of the system, and will not be repeated.

Figure 10:
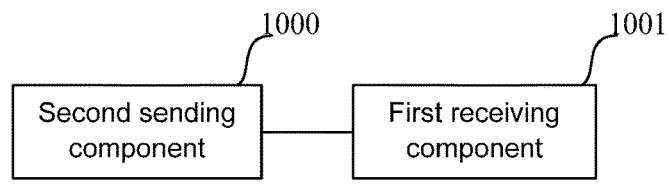
FIG. 10 is a schematic structural diagram of a second user terminal of an embodiment of the disclosure.

As shown in FIG. 10, an embodiment of the present disclosure provides another device binding device, which includes a second sending component 1000 and a first receiving component 1001.

The second sending component 1000 is configured to send target address information selected by a user to a server.

The first receiving component 1001 is configured to receive a verification password returned by the server, so that the user terminal sends, by means of a transmission device, the verification password to a device to be bound, the verification password is generated by the server by encrypting the target address information, and used to determine whether binding of the target address information to the device identifier of the device to be bound has been performed.

In some embodiments, the first receiving component 1001 is further configured to:

receive a valid time sent by the server, so that the user terminal sends, by means of the transmission device, the verification password to the device to be bound within the valid time, the valid time is the time used to indicate that the verification password is valid.

In some embodiments, the first receiving component 1001 is further configured to:

send the target address information to the server, so that the server determines the device identifier according to the target address information and the binding relationship between the target address information and the device identifier; and send a control instruction to the server, so that the server sends the control instruction to the device corresponding to the determined device identifier.

Based on the same inventive concept, an embodiment of the present disclosure further provides a device binding device. Since the device is a device to be bound in the device binding system in the embodiments of the present disclosure, and the principle the device solves the problem is similar to the method, so the embodiment of this device may refer to the embodiment of the system, and will not be repeated.

Figure 11:
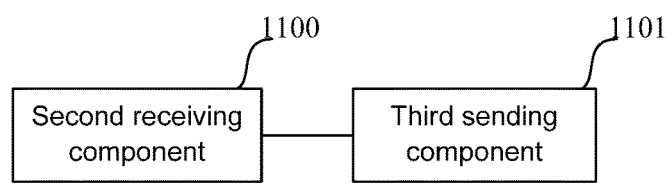
FIG. 11 is a schematic structural diagram of a second device to be bound of an embodiment of the present disclosure.

As shown in FIG. 11, an embodiment of the present disclosure provides a device binding device, which includes a second receiving component 1100 and a third sending component 1101.

The second receiving component 1100 is configured to receive a verification password sent by a user terminal by means of a transmission device.

The third sending component 1101 is configured to send the verification password and a device identifier of the device to be bound to the server, so that the server determines according to the verification password whether binding of the received target address information to the device identifier of the device to be bound has been performed.

In some embodiments, the third sending component is specifically configured to:

send the verification password and the device identifier of the device to be bound, by means of a NB-IoT component, to the server.

Further, an embodiment of the present disclosure further provides a device binding readable storage medium, including program codes. When the program codes run on a computing device, the program codes are used to make the computing device execute operations of the device binding method.

The present disclosure is described above with reference to block diagrams and/or flowcharts illustrating methods, device (systems) and/or computer program products according to embodiments of the present disclosure. It is understood that one block of the block diagram and/or flowchart diagram and a combination of the blocks in the block diagram and/or flowchart diagram may be implemented by computer program instructions. These computer program instructions may be provided to the processor of a general-purpose computer, a special-purpose computer, and/or other programmable data processing devices to produce a machine, so that the instructions executed via the computer processor and/or other programmable data processing device are created for a method of implementing the function(s)/action(s) specified in the block diagrams and/or flowchart blocks.

Accordingly, the present disclosure may further be implemented by hardware and/or software (including firmware, resident software, microcode, etc.). Furthermore, the present disclosure may take the form of a computer program product on a computer-usable or computer-readable storage medium, which has a computer-usable or computer-readable program code implemented in the medium for use by or in connection with an instruction execution system. In the context of the present disclosure, a computer-usable or computer-readable medium may be any medium that may contain, store, communicate, transmit, or transmit a program for use by or in connection with an instruction execution system, device, or device.

Apparently, those skilled in the art can make a variety of modifications and variations of the present disclosure without departing from the spirit and scope of the present disclosure. Thus, if these modifications and variations of the present disclosure are within the scope of the claims and their equivalents thereof, the present disclosure is also intended to include these modifications and variations.

What is claimed is:

1. A device binding method, comprising:
    sending, by a user terminal, target address information selected by a user to a server;
    receiving, by the user terminal, a verification password returned by the server,
    wherein after the user terminal receives the verification password returned by the server,
        sending, by the user terminal, the target address to the server, so that the server determines the device identifier according to the target address information and the binding relationship between the target address information and the device identifier;
    sending, by the user terminal, by means of a transmission device, the verification password to a device to be bound, wherein the verification password is generated by the server by encrypting the target address information, and used to determine whether binding of the target address information to the device identifier of the device to be bound has been performed.

2. The method as claimed in claim 1, wherein after the user terminal sends the target address information selected by the user to the server, the method further comprises:
    receiving, by the user terminal, a valid time sent by the server, so that the user terminal sends, by means of the transmission device, the verification password to the device to be bound within the valid time, wherein the valid time is the time used to indicate that the verification password is valid.

3. The method as claimed in claim 1, wherein the device to be bound sending the verification password and the device identifier of the device to be bound to the server comprises:
    sending, by the device to be bound by means of a Narrow- Band Internet of Things (NB-IoT) component, the verification password and the device identifier of the device to be bound to the server.

4. A device binding device, comprising: a processing unit and a storage unit, wherein the storage unit stores program codes, and when one or more computer programs stored in the storage unit are executed by the processing unit, the processing unit executes the following processes:

sending target address information selected by a user to a server;

receiving a verification password returned by the server, so that the user terminal sends, by means of a transmission device, the verification password to a device to be bound, wherein the verification password is generated by the server by encrypting the target address information, and used to determine whether binding of the target address information to the device identifier of the device to be bound has been performed, send the target address information to the server, so that the server determines the device identifier according to the target address information and a binding relationship between the target address information and the device identifier; and send a control instruction to the server, so that the server sends the control instruction to the device corresponding to the determined device identifier.

5. The device as claimed in claim 4, wherein the processing unit is further configured to:

receive a valid time sent by the server, so that the user terminal sends, by means of the transmission device, the verification password to the device to be bound within the valid time, wherein the valid time is configured to indicate that the verification password is valid.

* * * * *